(12) United States Patent
Hou et al.

(10) Patent No.: US 9,720,549 B2
(45) Date of Patent: Aug. 1, 2017

(54) TOUCH-SENSITIVE DISPLAY DEVICE

(71) Applicant: WISTRON CORP., New Taipei (TW)

(72) Inventors: Chia-Chang Hou, New Taipei (TW); Shih-Che Chien, New Taipei (TW)

(73) Assignee: WISTRON CORP., New Taipei (TW)

( * ) Notice: Subject to any disclaimer, the term of this patent is extended or adjusted under 35 U.S.C. 154(b) by 387 days.

(21) Appl. No.: 14/622,682

(22) Filed: Feb. 13, 2015

(65) Prior Publication Data

US 2016/0054856 A1 Feb. 25, 2016

(30) Foreign Application Priority Data

Aug. 20, 2014 (TW) .............................. 103128672 A (51) Int. Cl.
  *G06F 3/041* (2006.01)
  *G06F 3/042* (2006.01)
  *G06F 1/16* (2006.01)

(52) U.S. Cl.
  CPC .......... *G06F 3/0421* (2013.01); *G06F 1/1601* (2013.01); *G06F 1/1607* (2013.01); *G06F 3/0428* (2013.01); *G06F 2200/1612* (2013.01)

(58) Field of Classification Search
  CPC ......... G05B 2219/23377; G06F 3/0421; G06F 2203/04107; G06F 3/0488; G06F 3/03547
  USPC ............................ 362/600–634; 345/173–178
  See application file for complete search history.

(56) References Cited

U.S. PATENT DOCUMENTS

| 7,230,611 B2* | 6/2007 | Bischoff | G06F 3/0421 345/175 |
| 7,480,813 B2 | 1/2009 | Asoh et al. | |
| 7,639,237 B2* | 12/2009 | Perkins | G06F 1/1615 345/156 |
| 8,289,299 B2* | 10/2012 | Newton | G06F 3/042 345/175 |
| 8,581,882 B2* | 11/2013 | Sohn | G02F 1/13338 345/156 |
| 8,659,561 B2* | 2/2014 | Yu | G06F 3/0428 345/173 |

(Continued)

FOREIGN PATENT DOCUMENTS

| TW | 201324282 A1 | 6/2013 |
| TW | 201327318 A1 | 7/2013 |

OTHER PUBLICATIONS

TW Office Action dated May 26, 2016 as received in Application No. 103128672 (English Translation).

*Primary Examiner* — William Carter
(74) *Attorney, Agent, or Firm* — Maschoff Brennan (57) ABSTRACT

A touch-sensitive display device includes a display body, a container, a movable cover and at least two optical modules. The display body has a display surface. The container is connected with the display body. The movable cover pivots on the container so as to have an open position and a storage position. The two optical modules are disposed on the movable cover. When the movable cover is at the open position, the two optical modules protrudes outward from an extended surface of the display surface, such that the two optical modules is exposed outward from the container. When the movable cover rotates from the open position to the storage position, the movable cover drives the two optical modules to move backward to be underneath the extended surface of the display surface, such that the two optical modules are located inside the container.

14 Claims, 11 Drawing Sheets

(56) References Cited

U.S. PATENT DOCUMENTS

2006/0202974 A1* 9/2006 Thielman .............. G06F 3/0421
                                                      345/175
2013/0141389 A1   6/2013 Chou et al.
2014/0118704 A1* 5/2014 Duelli .................. H04N 9/3173
                                                       353/70
2015/0341070 A1* 11/2015 Sanford ............... H04B 1/3888
                                                      455/575.8

* cited by examiner

TOUCH-SENSITIVE DISPLAY DEVICE

CROSS-REFERENCE TO RELATED APPLICATIONS

This non-provisional application claims priority under 35 U.S.C. §119(a) on Patent Application No(s). 103128672 filed in Taiwan, R.O.C. on Aug. 20, 2014, the entire contents of which are hereby incorporated by reference.

BACKGROUND

Technical Field

The disclosure relates to a touch-sensitive display device. More particularly, the disclosure relates to a touch-sensitive display device with planar appearance.

Background

Generally speaking, optical touch technology is roughly distinguished into light-shading type and reflective type. The light-shading type means that light sources are disposed at edges of a touch display. When an object approaches the touch display, lights emitted from the light sources are blocked to form a shade. Then, the position data such as orientation, width and height of the shade will be detected by cameras and sensors for touch sensing. An optical stylus with a reflective surface is usually utilized for the reflective type of optical touch technology. When the optical stylus approaches or contacts the touch display, the light emitted from the light sources are reflected by the reflective surface for obtaining relative positions of the light sources and the optical stylus. Then, according to the relative positions of the light sources and the optical stylus, the position data of the optical stylus are detected for touch sensing.

However, the touch display needs at least two optical sensors no matter the touch display is a light-shading type display or a reflective type display. Additionally, the two optical sensors need to protrude outward from a touch surface of the touch display. Accordingly, it is difficult for the touch display to be planar or slimmer. To sum up, it is important to provide a touch-sensitive display device with a planar appearance which is combined with the optical sensors.

SUMMARY

One aspect of the disclosure provides a touch-sensitive display device, which comprises a display body, a container, a movable cover and at least two optical modules. The display body has a display surface. The container is connected with the display body and next to the display surface. The movable cover pivots on the container so as to have an open position and a storage position. The two optical modules are disposed on the movable cover. When the movable cover is at the open position, the two optical modules protrudes outward from an extended surface of the display surface, such that the two optical modules is exposed outward from the container. The two optical modules are used for emitting and sensing lights, so as to form an optical touch-sensitive area upon the display surface. When the movable cover rotates from the open position to the storage position, the movable cover drives the two optical modules to move backward to be underneath the extended surface of the display surface, such that the two optical modules are located inside the container.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
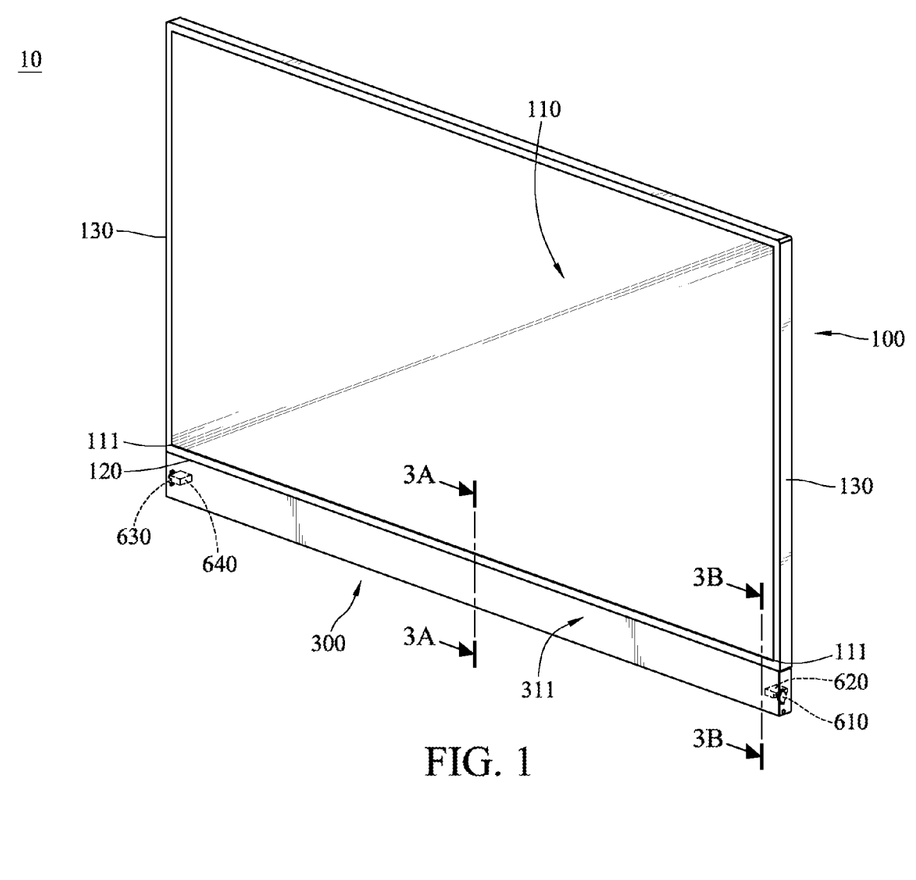
FIG. 1 is a perspective view of a touch-sensitive display device according to a first embodiment of the disclosure.
Figure 2A:
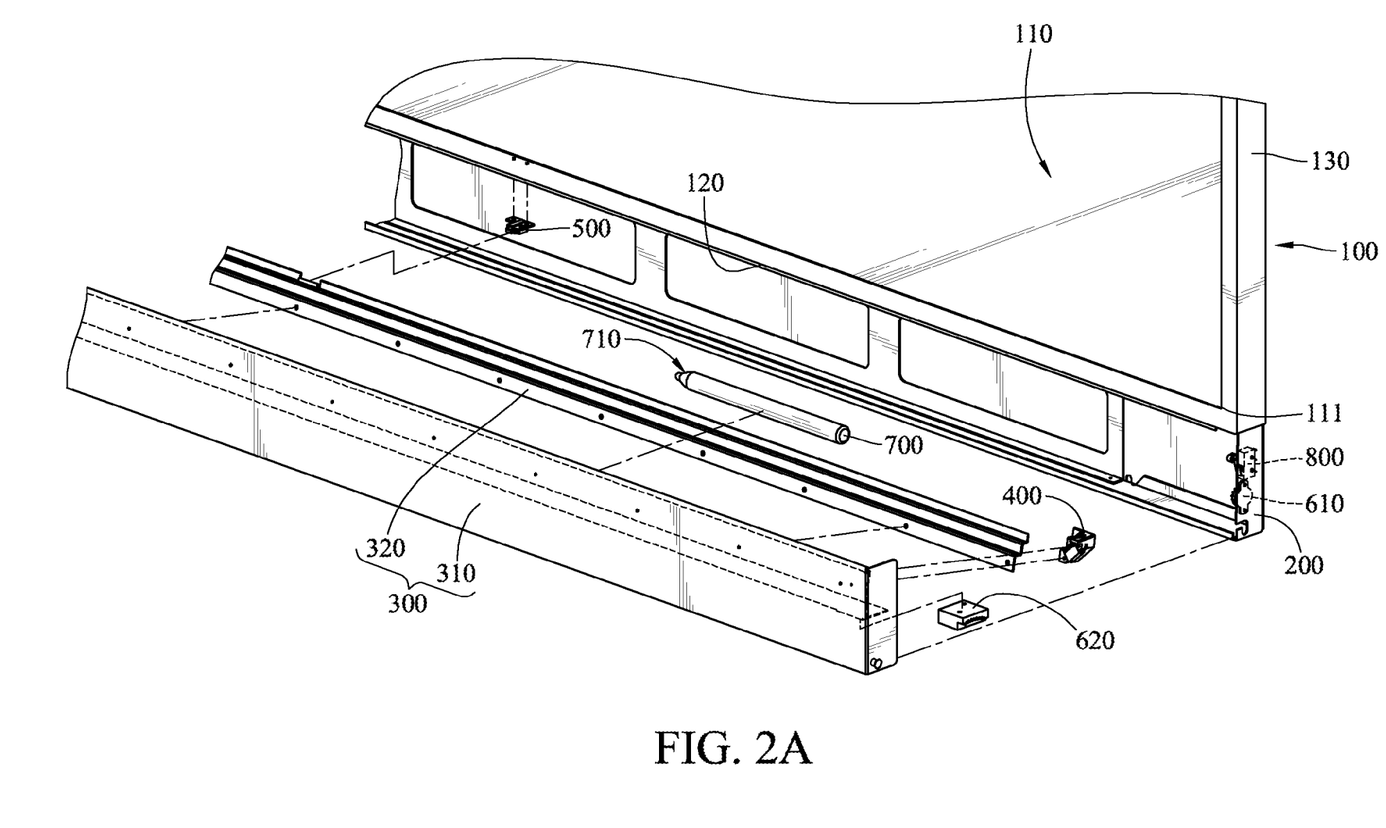
FIG. 2A is a partially exploded view of the touch-sensitive display device in FIG. 1.
Figure 2B:
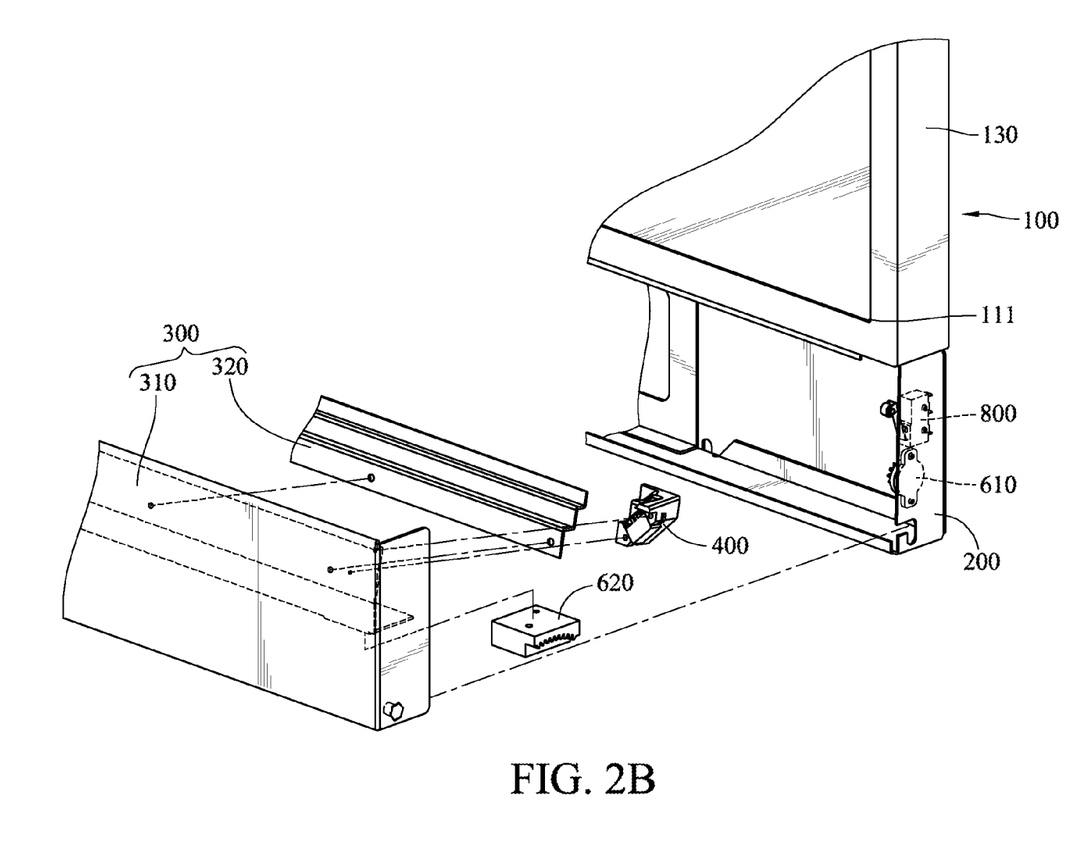
FIG. 2B is a partially enlarged view of the touch-sensitive display device in FIG. 2A.
Figure 3A:
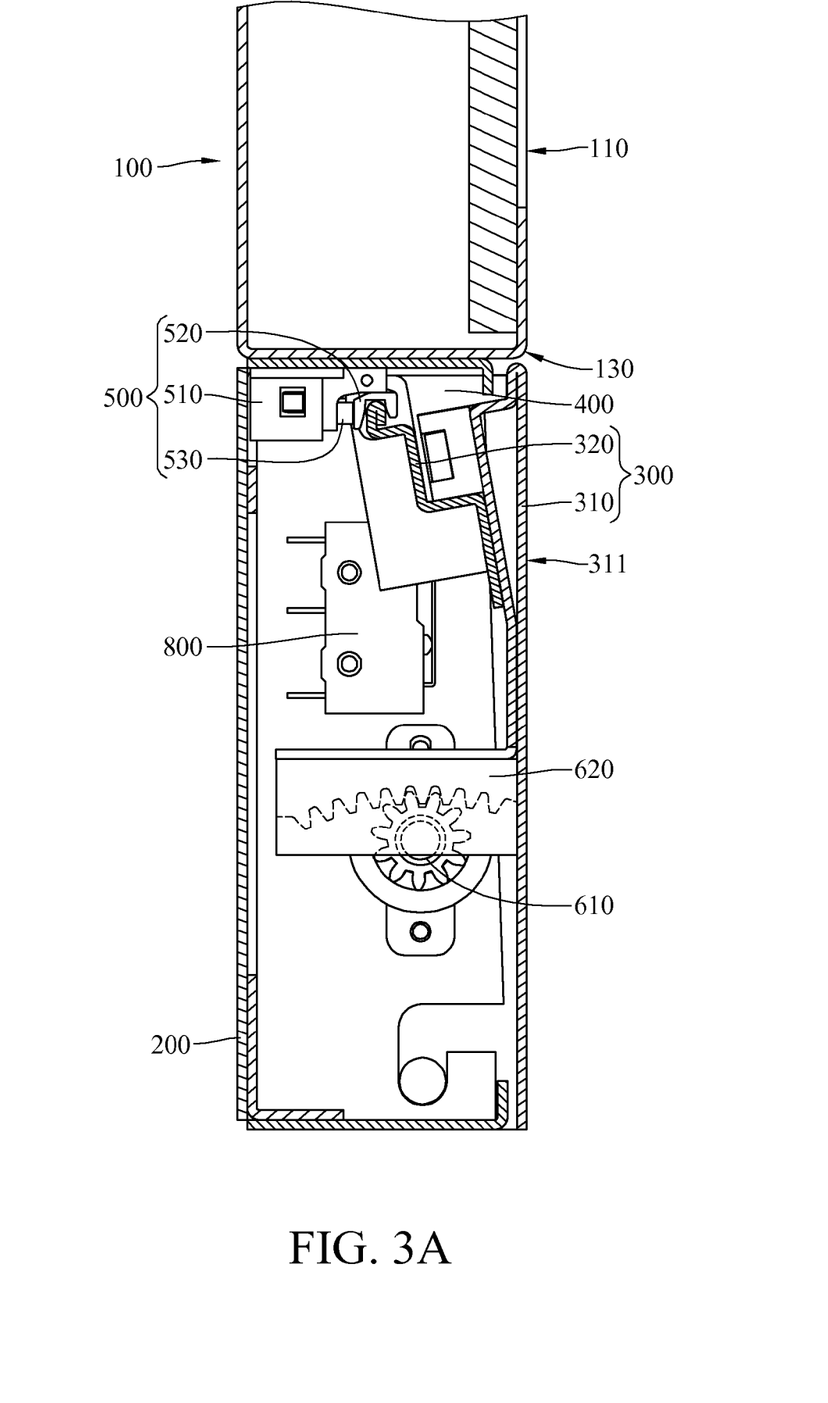
FIG. 3A is a cross-sectional view of the touch-sensitive display device in FIG. 1 along a section line 3A-3A.
Figure 3B:
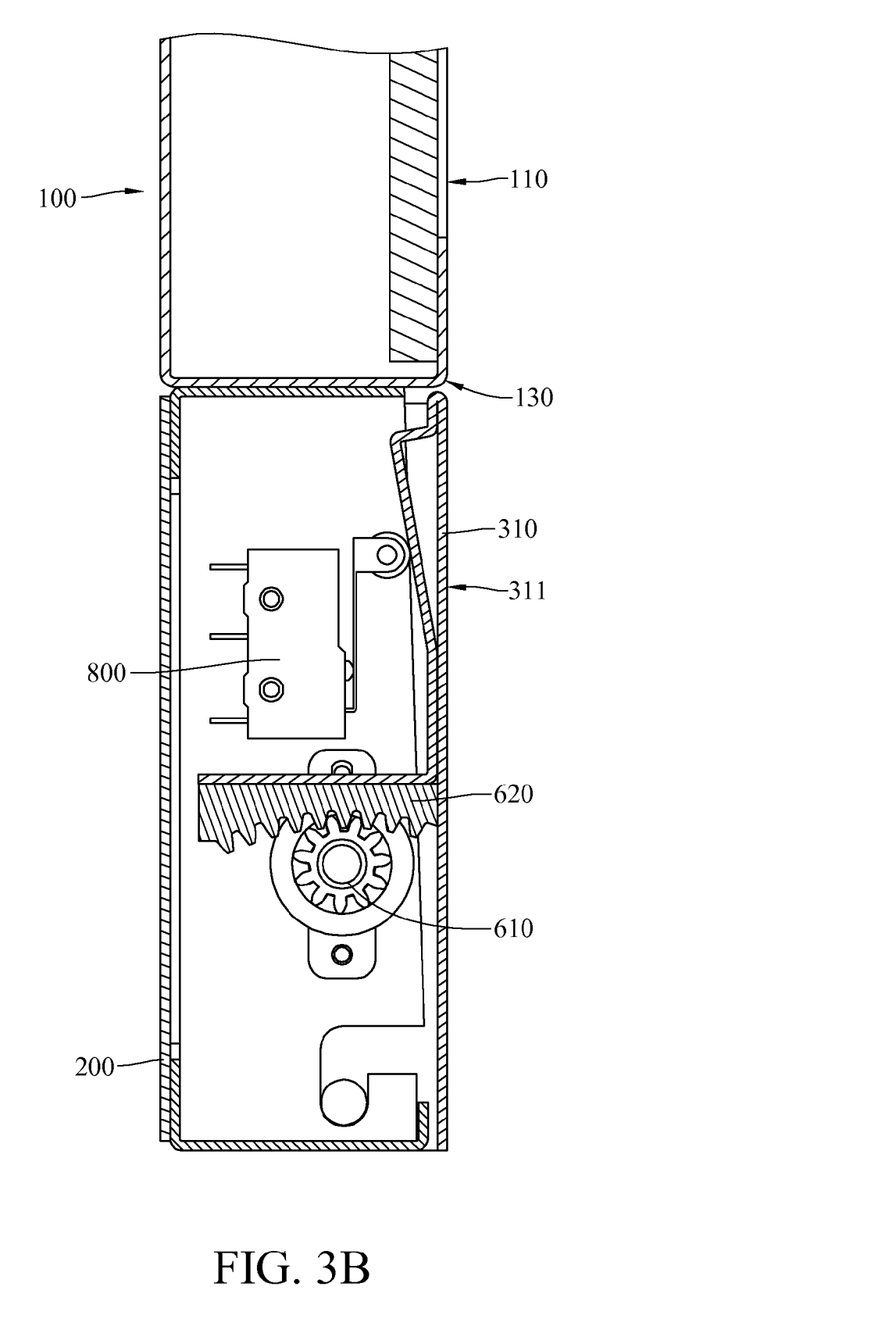
FIG. 3B is a cross-sectional view of the touch-sensitive display device in FIG. 1 along a section line 3B-3B.

Please refer to FIG. 1 through FIG. 3B. FIG. 1 is a perspective view of a touch-sensitive display device according to a first embodiment of the disclosure. FIG. 2A is a partially exploded view of the touch-sensitive display device in FIG. 1. FIG. 2B is a partially enlarged view of the touch-sensitive display device in FIG. 2A. FIG. 3A is a cross-sectional view of the touch-sensitive display device in FIG. 1 along a section line 3A-3A. FIG. 3B is a cross-sectional view of the touch-sensitive display device in FIG. 1 along a section line 3B-3B. As shown in FIG. 1 and FIG. 2A. In this embodiment, the touch-sensitive display device 10 comprises a display body 100, a container 200, a movable cover 300, two optical modules 400, a movable latch 500, a first damping gear 610, a second damping gear 630, a first rack 620, a second rack 640, an optical stylus 700 and a switch button 800, wherein the first damping gear 610 is symmetrical with the second damping gear 630, and the first rack 620 is symmetrical with the second rack 640.

The display body 100, such as a television, a tablet computer or an all-in-one computer, has a display surface 110. The display body 100 has a bottom edge 120 and two side edges 130 that are opposite to each other. The bottom edge 120 is located at the bottom of the display surface 110, and the two side edges 130 are connected to two ends of the bottom edge 120, respectively. The container 200 is connected to the display body 100 at the bottom edge 120, and located next to the display surface 110.

The movable cover 300 comprises a cover plate 310 and a positioning plate 320. The cover plate 310 pivots on the container 200. The cover plate 310 has an external surface 311 which is facing opposite away from the container 200. The positioning plate 320 is connected to the cover plate 310 and located between the cover plate 31 and the container 200. The movable cover 300 is for rotating relative to the container 200, such that the movable cover 300 has a storage position (as shown in FIG. 3A) and an open position (as shown in FIG. 3A). When the movable cover 300 is at the storage position, the external surface 311 and the display surface 110 are coplanar. Furthermore, when the movable cover 300 is at the open position, at least a part of the cover plate 310 protrudes outward from the display surface 110. In addition, the positioning plate 320 is connected to the cover plate 310 and located between the cover plate 310 and the container 200.

The two optical modules 400 are affixed to the movable cover 300 and located between the cover plate 310 and the positioning plate 320. The two optical modules 400 correspond to two corners 111 of the display surface 110, respectively, and the two corners 111 are neighboring to each other. The two optical modules 400 are utilized for emitting light and sensing the light reflected.

The movable latch 500 is, for example, a pressing latch device. An external force can be applied to the movable latch 500 for driving the positioning plate 320 to be fastened with or released (separated) from the movable latch 500. The movable latch 500 comprises a fixed component 510, a latching component 520 and a press component 530. The fixed component 510 is assembled with the container 200. The latching component 520 pivots on the fixed component 510. The press component 530 is slidably connected to the fixed component 510 for driving the latching component 520 to rotate relative to the fixed component 510, such that the positioning plate 320 is fastened with or released (separated from) the latching component 520.

The first damping gear 610 and the second damping gear 630 are disposed at two sides of the container 200 which are opposite to each other. The first rack 620 and the second rack 640 are disposed at two sides of the cover plate 310 which are opposite to each other, respectively. Additionally, the first damping gear 610 meshes with the first rack 620 and the second damping gear 630 meshes with the second rack 640. The first damping gear 610 and the second damping gear 630 are for buffering the first rack 620 and the second rack 640, so as to control the first rack 620 and the second rack 640 to move slowly, respectively. However, the quantity of the damping gears and the quantity of the racks are, but not limited to, two. In other embodiments, both quantities of the damping gear and the rack both are one, or more than two.

The optical stylus 700 has a reflective surface 710 for reflecting the lights emitted from the optical module 400. Accordingly, the optical module 400 can detect the current position of the optical stylus 700. Moreover, the optical stylus 700 is detachably assembled with the movable cover 300.

The switch button 800 is disposed at the container 200 and electrically connected to the two optical modules 400. When the switch button 800 is pressed, the two optical modules 400 are driven to be turned off. When the switch button 800 is not pressed, the two optical modules 400 are driven to be turned on.

Figure 4A:
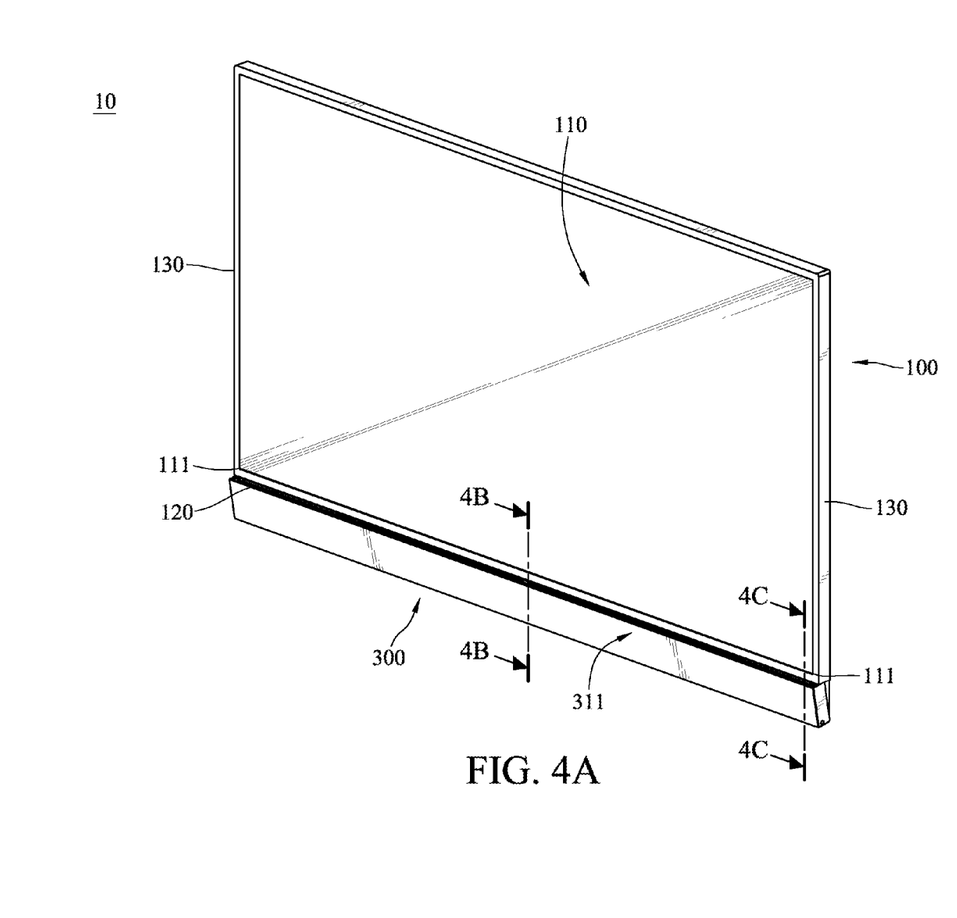
FIG. 4A is a perspective view of a movable cover in FIG. 1 which is at an open position.
Figure 4B:
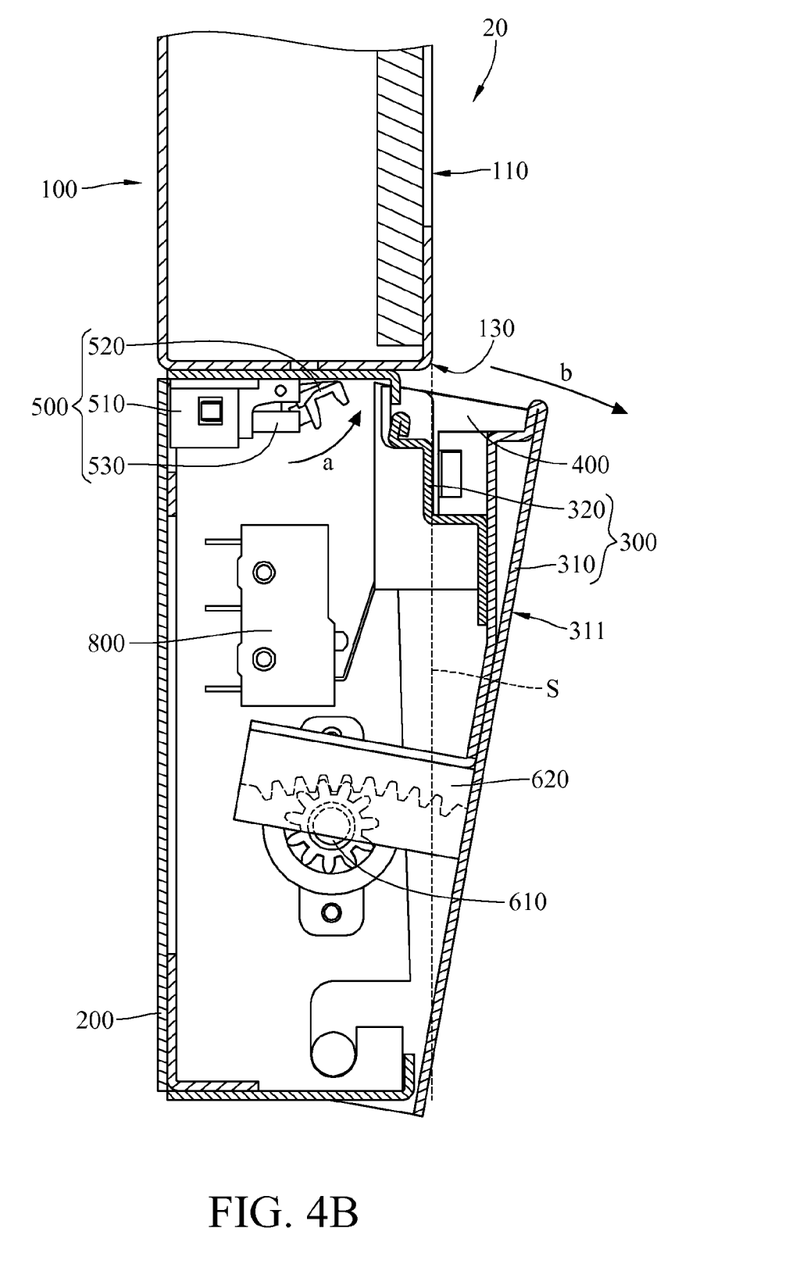
FIG. 4B is a cross-sectional view of the movable cover in FIG. 4A along a section line 4B-4B.
Figure 4C:
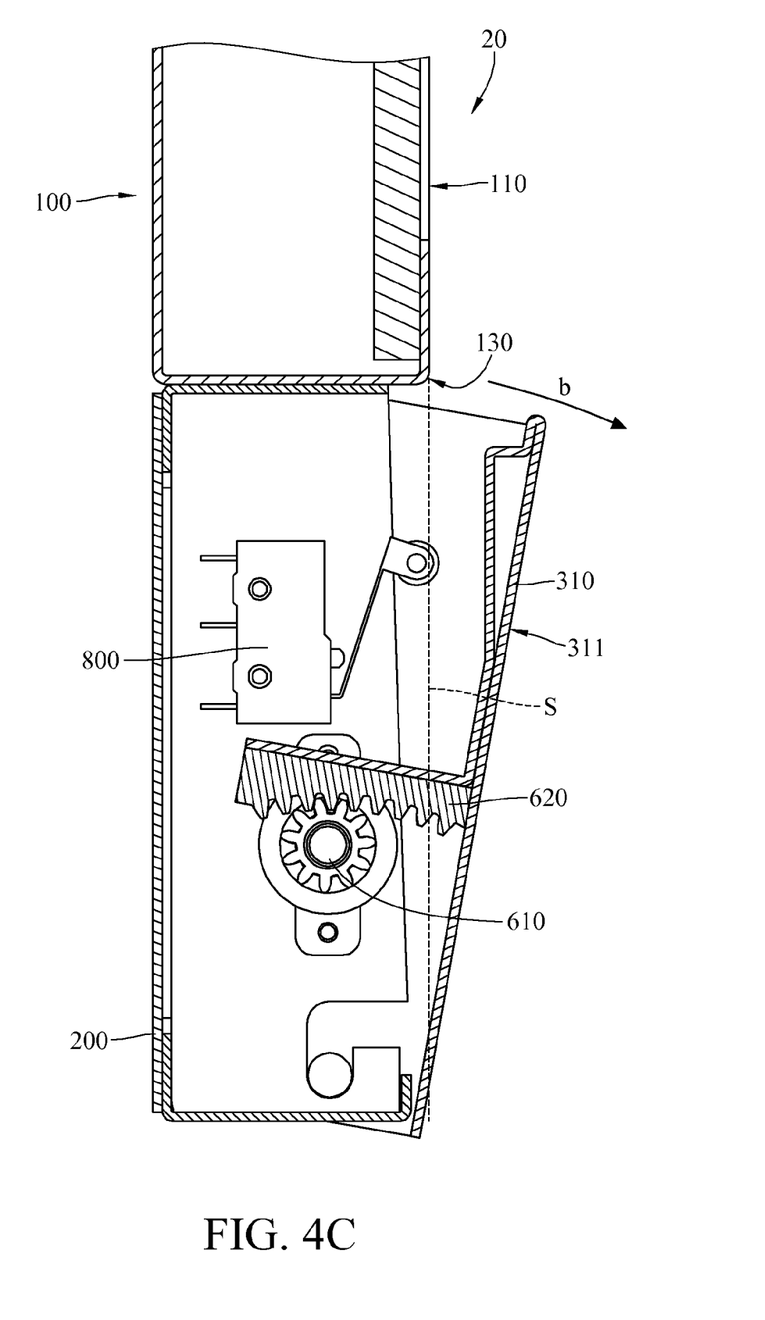
FIG. 4C is a cross-sectional view of the movable cover in FIG. 4A along a section line 4C-4C.

Please refer to FIG. 3A through FIG. 4C. FIG. 4A is a perspective view of a movable cover in FIG. 1 which is at an open position. FIG. 4B is a cross-sectional view of the movable cover in FIG. 4A along a section line 4B-4B. FIG. 4C is a cross-sectional view of the movable cover in FIG. 4A along a section line 4C-4C. As shown in FIG. 3A and FIG. 3B, when the positioning plate 320 is fastened with the latching component 520, the movable cover 300 is limited to be at the storage position. Additionally, when the movable cover 300 is at the storage position, the two optical modules 400 are located inside the container 200 (namely, the container 200 accommodates the two optical modules 400), and the external surface 311 of the cover plate 310 and the display surface 110 are coplanar, such that the appearance of the touch-sensitive display device 10 becomes planar.

Moreover, when the movable cover 300 is at the storage position, the switch button 800 is pressed by the cover plate 310, and then the switch button 800 is triggered by the positioning plate 320, so as to control the two optical modules 400 to be turned off temporarily. Accordingly, some touch signals are not being sensed when the two optical modules 400 are turned off for preventing from receiving undesired touch signals.

As shown in FIG. 4A, FIG. 4B and FIG. 4C, when the cover plate 310 is pressed by a user, the latching component 520 rotates counterclockwise (along an arrow a) relative to the fixed component 510 and releases the positioning plate 320. At the same time, the movable cover 300 rotates clockwise (along an arrow b) to the open position, and the two optical modules protrudes outward from the extended surface S of the display surface 110, such that the two optical modules 400 is exposed outward from the container 200. When the movable cover 300 rotates from the open position to the storage position, each rack drives the movable cover 300 to rotate slowly. Thus, an impact force between movable cover 300 and the container 200 is reduced so as to protect the two optical modules 400 from damage. Furthermore, when the movable cover 300 is at the open position, the cover plate 310 is free from being pressed against the switch button 800, and then the positioning plate 320 is separated from the switch button 800. Therefore, an optical touch-sensitive area 20 is formed upon the display surface 110 by the light emitted from the optical modules 400.

Figure 5:
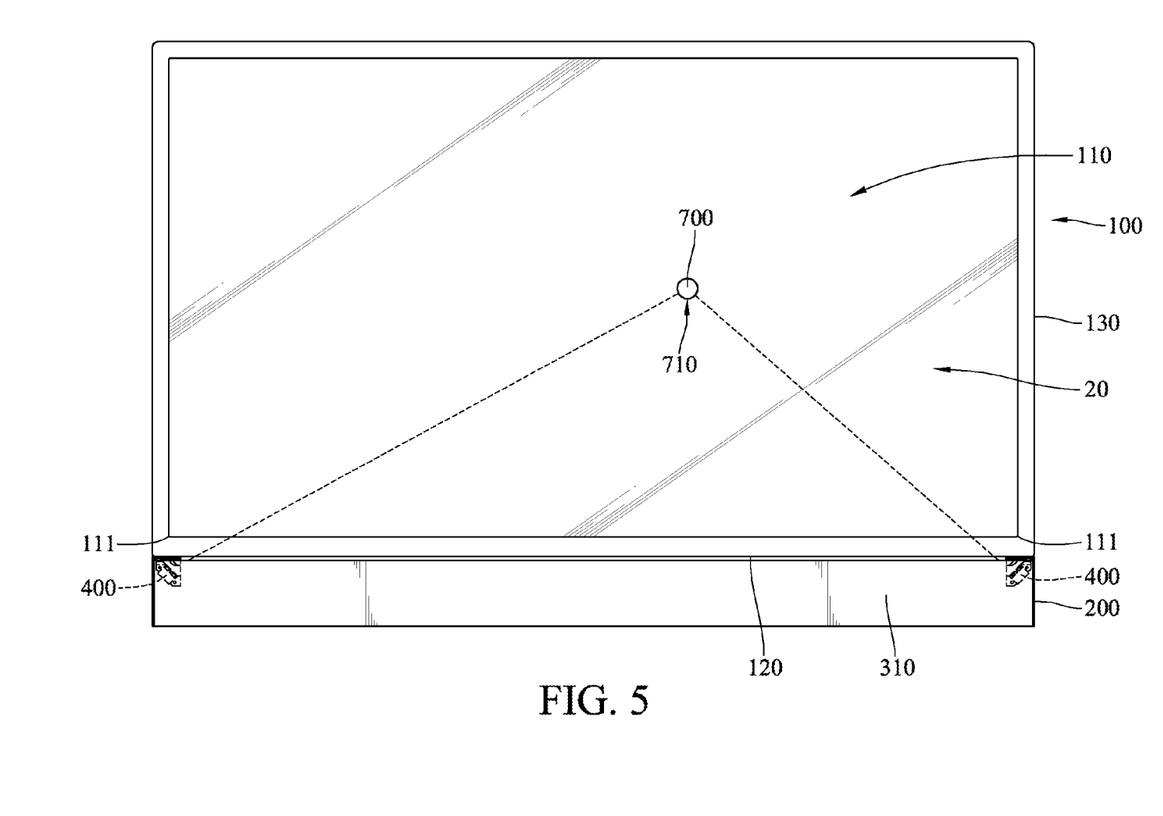
FIG. 5 is a schematic plan view of the touch-sensitive display device when the movable cover is at the open position and an optical stylus is located at an optical touch-sensitive area.

Please refer to FIG. 5 which is a schematic plan view of the touch-sensitive display device when the movable cover is at the open position and an optical stylus is located at an optical touch-sensitive area. As shown in FIG. 5, when the optical stylus 700 is located at the optical touch-sensitive area 20, the light emitted from one of the two optical modules 400 is reflected by the reflective surface 710 of the optical stylus 700 and then sensed by the other optical module 400, for positioning where the optical stylus 700 is located.

In this embodiment, the movable cover 300 is, but not limited to, driven mechanically (for example, driven by the movable latch 500). For example, in other embodiments, the movable cover 300 is controlled to be at the open position or the storage position by a remote controller with an electric motor connected to the movable cover 300.

Figure 6:
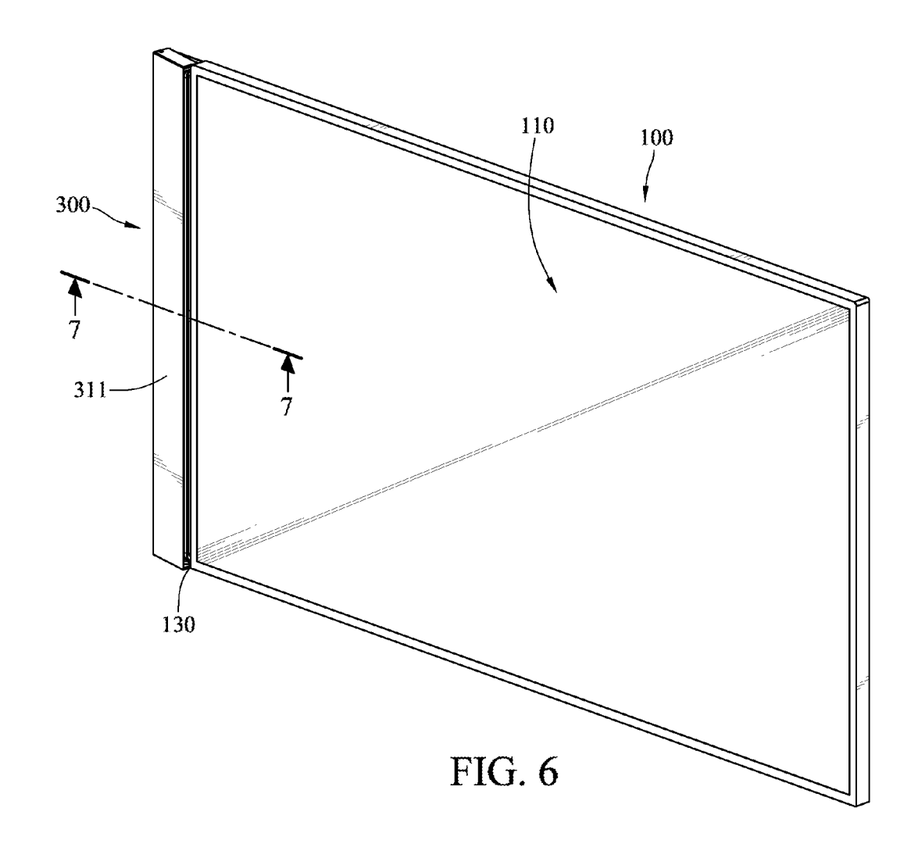
FIG. 6 is a perspective view of a touch-sensitive display device according to a second embodiment of the disclosure.
Figure 7:
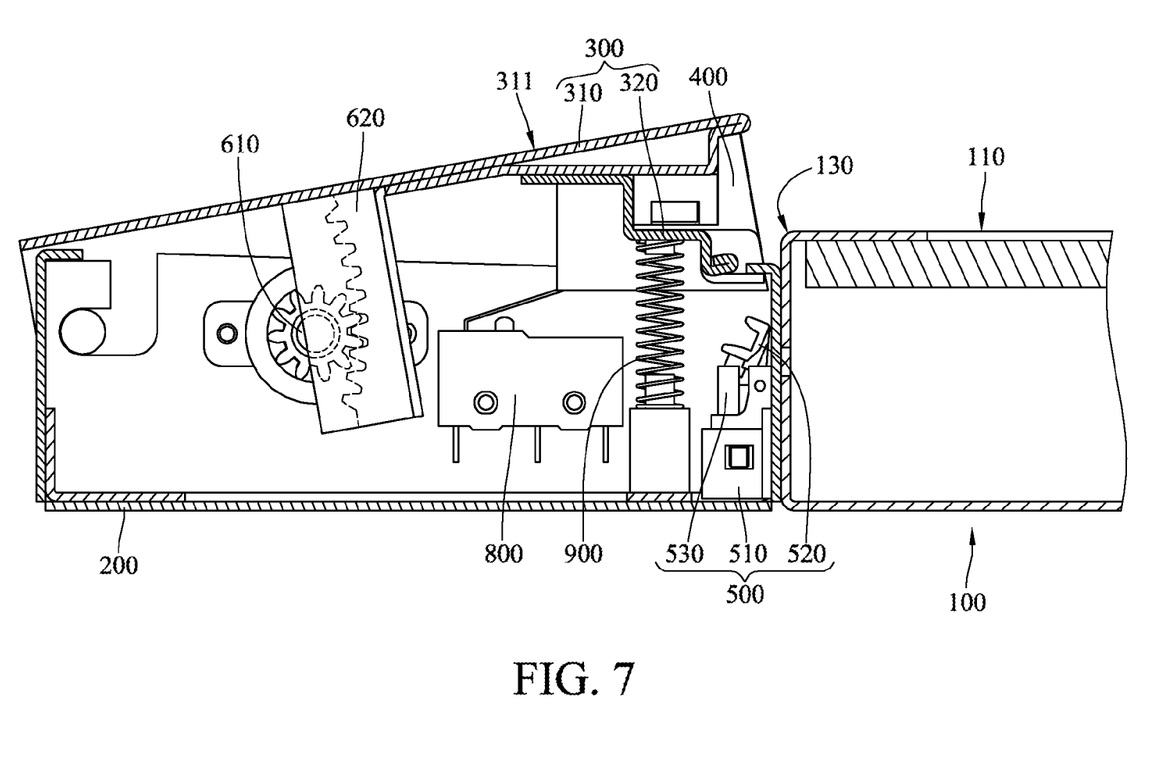
FIG. 7 is a cross-sectional view of the touch-sensitive display device in FIG. 6 along a section line 7-7.

In the first embodiment, the container 200 is connected to the bottom edge 120 of the display body 100. However, the disclosure is not limited to the container 200 being connected to the bottom edge 120 of the display body 100. Please refer to FIG. 6 and FIG. 7. FIG. 6 is a perspective view of a touch-sensitive display device according to a second embodiment of the disclosure. FIG. 7 is a cross-sectional view of the touch-sensitive display device in FIG. 6 along a section line 7-7. In this embodiment, the container 200 is connected to the side edge 130 of the display body 100. Additionally, the touch-sensitive display device 10 further comprises a compression spring 900 with two ends.

The two ends of the compression spring 900 are connected to the container 200 and the movable cover 300, respectively. When the positioning plate 320 is released (separated) from the latching component 520, the movable cover 300 is maintained at the open position by the compression spring 900.

Compared this embodiment with the first embodiment, in the first embodiment, when the container 200 is connected to the bottom edge 120 of the display body 100, the movable cover 300 is driven by the gravity during rotation from the storage position to the open position. Different from the first embodiment, in this embodiment, when the container 200 is connected to the side edge 130 of the display body 100, the movable cover 300 is not driven by the gravity during rotation from the storage position to the open position. Thus, the compression spring 900 is beneficial for driving the movable cover 300 to rotate to the open position.

According to the touch-sensitive display device of the disclosure, since the movable cover is rotatable and the two optical modules are disposed at the movable cover, the movable cover can drive the two optical modules to be located inside the container for beautifying the touch-sensitive display device since the appearance is planar, or drive two optical modules to protrude outward from the display surface for providing optical touch function.

Furthermore, a switch button is disposed inside the container. When the movable cover is at the storage position, the switch button is pressed by the cover plate for driving the two optical modules to be turned off temporarily. Thus, undesired touch signals are not being sensed by the two optical modules which are turned off.

The disclosure will become more fully understood from the said embodiment for illustration only and thus does not limit the disclosure. Any modifications within the spirit and category of the disclosure fall in the scope of the disclosure.

What is claimed is:

1. A touch-sensitive display device, comprising:
   a display body having a display surface;
   a container connected with the display body and next to the display surface;
   a movable cover pivoting on the container so as to have an open position and a storage position; and
   at least two optical modules disposed on the movable cover, when the movable cover is at the open position, the two optical modules protrudes outward from an extended surface of the display surface, such that the two optical modules is exposed outward from the container, and the two optical modules is for emitting and sensing lights so as to form an optical touch-sensitive area upon the display surface, when the movable cover rotates from the open position to the storage position, the movable cover drives the two optical modules to move backward to be underneath the extended surface of the display surface, such that the two optical modules are located inside the container.

2. The touch-sensitive display device according to claim 1, wherein the container is located at a bottom edge of the display body.

3. The touch-sensitive display device according to claim 2, further comprising a movable latch comprising a fixed component, a latching component and a press component, the fixed component assembled with the container, the latching component pivoting on the fixed component, the press component slidably connected to the fixed component, the movable cover comprising a cover plate and a positioning plate, the positioning plate connected to the cover plate, the two optical modules located between the cover plate and the positioning plate, the press component being for driving the latching component to limit the movable cover to be at the storage position by buckling the positioning plate and for driving the movable cover to move to be at the open position by releasing the positioning plate.

4. The touch-sensitive display device according to claim 3, further comprising at least one damping gear and at least one rack, the at least one damping gear disposed at the container and meshed with the at least one rack, and the at least one rack disposed at the cover plate.

5. The touch-sensitive display device according to claim 4, wherein both quantities of the at least one damping gear and the at least one rack are two, the two damping gears are located at two sides of the container which are opposite to each other, and the two racks are located at two sides of the cover plate which are opposite to each other.

6. The touch-sensitive display device according to claim 3, further comprising a switch button disposed at the container and for controlling the two optical modules to be turned on or off, when the movable cover is at the open position, the positioning plate of the movable cover is separated from the switch button, and the two optical modules are controlled to be turned on by the switch button, when the movable cover is at the storage position, the switch button is activated by the positioning plate so as to control the two optical modules to be turned off.

7. The touch-sensitive display device according to claim 1, further comprising a compression spring with two ends, the container located at a side edge of the display body, the two ends of the compression spring connected to the container and the movable cover, respectively, and the movable cover maintained at the open position by the compression spring.

8. The touch-sensitive display device according to claim 7, further comprising a movable latch comprising a fixed component, a latching component and a press component, the fixed component assembled with the container, the latching component pivoting on the fixed component, the press component slidably connected to the fixed component, the movable cover comprising a cover plate and a positioning plate, the positioning plate connected to the cover plate, the two optical modules located between the cover plate and the positioning plate, the press component being for driving the latching component to limit the movable cover to be at the storage position by buckling the positioning plate and for driving the movable cover to move to be at the open position by releasing the positioning plate.

9. The touch-sensitive display device according to claim 8, further comprising at least one damping gear and at least one rack, the at least one damping gear disposed at the container and meshed with the at least one rack, and the at least one rack disposed at the cover plate.

10. The touch-sensitive display device according to claim 9, wherein both quantities of the at least one damping gear and the at least one rack are two, the two damping gears are located at two sides of the container which are opposite to each other, and the two racks are located at two sides of the cover plate which are opposite to each other.

11. The touch-sensitive display device according to claim 8, further comprising a switch button disposed at the container and for controlling the two optical modules to be turned on or off, when the movable cover is at the open position, the positioning plate of the movable cover is separated from the switch button, and the two optical modules are controlled to be turned on by the switch button, when the movable cover is at the storage position, the switch button is activated by the positioning plate so as to control the two optical modules to be turned off.

12. The touch-sensitive display device according to claim 1, further comprising an optical stylus with a reflective surface, and the optical stylus detachably connected to the movable cover.

13. The touch-sensitive display device according to claim 1, wherein the display surface has two corners adjacent to each other, and the two optical modules are located at the two corners of the display surface, respectively.

14. The touch-sensitive display device according to claim 1, wherein the movable cover has an external surface facing away from the container, and when the movable cover is at the storage position, the external surface and the display surface are coplanar.

* * * * *